United States Patent [19]

Tank et al.

[11] Patent Number: 4,941,891
[45] Date of Patent: Jul. 17, 1990

[54] TOOL COMPONENT

[76] Inventors: Klaus Tank, 9 Warbleton Avenue, Essexwold, Johannesburg, Transvaal, South Africa; Noel J. Pipkin, 138/140 Pritchard Street, Johannesburg North, Transvaal, South Africa

[21] Appl. No.: 218,644

[22] Filed: Jul. 13, 1988

[30] Foreign Application Priority Data

Jul. 14, 1987 [ZA] South Africa ............... 87/5132

[51] Int. Cl.$^5$ .................................... B24D 3/00
[52] U.S. Cl. ........................... 51/293; 51/295; 51/309
[58] Field of Search ................... 51/293, 295, 309

[56] References Cited

U.S. PATENT DOCUMENTS

| | | | |
|---|---|---|---|
| 4,373,934 | 2/1983 | Hayden | 51/309 |
| 4,505,721 | 3/1985 | Almond et al. | 51/309 |
| 4,527,998 | 6/1985 | Knemeyer | 51/309 |
| 4,705,123 | 11/1987 | Dennis | 51/309 |
| 4,772,294 | 9/1988 | Schroeder | 51/309 |

*Primary Examiner*—Paul Lieberman
*Assistant Examiner*—Willie J. Thompson
*Attorney, Agent, or Firm*—Scully, Scott, Murphy & Presser

[57] ABSTRACT

A tool component comprises an abrasive compact bonded to a support which itself is bonded through an alloy to an elongate cemented carbide pin. The alloy has a liquidus below 900° C. and the following composition, by weight:

| | |
|---|---|
| Mn | 15–41% |
| Cu | 67–41% |
| Ni | 1–5% |
| Au | 10–17% |

The shear strength of the bond achieved between the support and the pin exceeds 345 MPa.

15 Claims, 1 Drawing Sheet

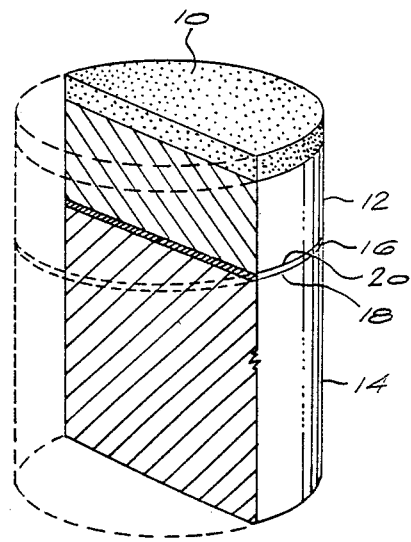

TOOL COMPONENT

BACKGROUND OF THE INVENTION

This invention relates to tool components.

Abrasive compacts are well known in the art and are used for a variety of abrading operations such as cutting, drilling, grinding, and the like. Abrasive compacts consist of a polycrystalline mass of bonded abrasive particles, the abrasive particle content of which is at least 70 percent by volume, and generally 80 to 90 percent by volume. The abrasive particles may be self-bonded without the aid or use of a second or bonding phase. Alternatively, a second or bonding phase may be provided. The abrasive particles for compacts are invariably diamond or cubic boron nitride.

Abrasive compacts may be bonded to cemented carbide supports. Such bonded compacts are often referred to as composite compacts. bonding between the compact and the carbide support may be direct, i.e. without the interposition of a braze layer. Alternatively, a bonding braze layer may be provided between the compact and the carbide support. A more detailed description of abrasive compacts and composite abrasive compacts may be found in a number of published patent specifications, for example, U.S. Pat. Nos. 3,743,489, 3,767,371, 4,063,909 and 3,745,623.

Rotary drills used for oil and gas well drilling and core drilling generally comprise a drill bit having formed thereon a plurality of pre-formed sockets in which cutting elements or components are mounted. The cutting elements or components may be brazed, force-fitted or heat shrunk into the sockets. Typical cutting elements used in the prior art are steel teeth, steel teeth laminated with tungsten carbide, inserts of cemented tungsten carbide, natural diamonds and composite abrasive compacts.

Cutting components for drill bits and utilising composite compacts have been described in the literature and have been used commercially. Such cutting components comprising an elongate pin of cemented carbide to which is bonded a composite compact, bonding being achieved through the carbide support of the composite compact. Bonding between the carbide support and the elongate pin is achieved by braze metal which has a melting point above 700° C. Such a high temperature braze, so the art teaches, is essential in order to achieve a sufficiently strong bond between the composite compact and the elongate pin. Reference in this regard may be had to disclosures of U.S. Pat. No. 4,225,322. The braze which is said in this patent specification to be useful is Anaconda 773 which is now thought to be undesirably reactive with the carbide pieces being joined.

European Patent Publication No. 213,300 and U.S. Pat. No. 4,527,998 describe braze alloys for bonding composite abrasive compacts to elongate pins which are said to have advantages over Anaconda 773. The alloy of the European publication contains palladium, chromium, boron and nickel while the alloy of the United States patent contains gold, nickel, palladium, manganese and copper.

Tool components are also available and used which comprise two carbide bodies bonded together or a carbide body bonded to a steel or like body. Strong bonds between such bodies are desirable.

SUMMARY OF THE INVENTION

According to the present invention, there is provided a tool component comprising a cemented carbide body bonded to a metal containing body by a braze alloy having a liquidus below 900° C. and having the following composition, by weight:

| | |
|---|---|
| Mn | 15–41% |
| Cu | 67–41% |
| Ni | 1–5% |
| Au | 10–17% | and the shear strength of the bond between the bodies exceeding 345 MPa.

According to another aspect of the invention, there is provided a method of bonding a cemented carbide surface to a metal containing surface including the steps of placing a layer of a braze alloy between the surfaces, the alloy containing 15–41% Mn, 67–41% Cu, 1–5% Ni and 10–17% Au, all percentages by weight, urging the surfaces together, and raising the temperature of the alloy to its working temperature thereby creating a bond between the surfaces which has a shear strength exceeding 345 MPa.

DESCRIPTION OF THE DRAWING

The drawing illustrates a partially sectioned perspective view of an embodiment of a tool component of the invention.

DETAILED DESCRIPTION OF THE INVENTION

Essential to the invention is the choice of the braze alloy which has a liquidus below 900° C. and which produces a bond strength exceeding 345 MPa. This braze alloy allows for a strong bond between the surfaces to be created at a low temperature. Preferably the shear strength of the bond between the surfaces is 415 MPa or higher. The liquidus temperature of the braze alloy is that temperature at which the alloy starts to melt. The working temperature is that temperature at which substantially all the alloy is in a molten state and is somewhat higher than the liquidus temperature. Generally the working temperature will be 30° to 50° C. higher than the liquidus temperature.

The metal containing body will generally also be a cemented carbide body. The cemented carbide may be any known in the art such as cemented tungsten carbide, cemented tantalum carbide, cemented titanium carbide, or mixtures thereof.

The cemented carbide body will preferably have an abrasive compact bonded to it. The degradation temperature of the abrasive compact is preferably at or above the working temperature of the alloy. The degradation temperature of the abrasive compact is that temperature at which substantial degradation of the abrasive particles of the compact occurs. The abrasive compact is preferably a diamond abrasive compact.

The method of bonding the cemented carbide surface to the other surface constitutes another aspect of the invention and will be described with reference to the drawing. A composite abrasive compact comprising an abrasive compact layer 10 bonded to a cemented carbide support 12 is provided. There is also provided an elongate cemented carbide pin 14. A layer 16 of the braze alloy is placed between the upper flat surface 18 of the pin 14 and the lower flat surface 20 of the support 12. The alloy layer 16 makes contact with both the surfaces 18 and 20. These surfaces are then urged together, for example by means of a suitable clamp or load otherwise applied. The temperature of the braze layer is raised to its working temperature. The alloy may be raised to its working temperature over a period of 5 to 20 minutes in a furnace. Alternatively, localised heating such as induction heating may be used in which case the temperature will be raised over a much shorter period, e.g. less than 150 seconds. A bond having a shear strength exceeding 345 MPa is created between the support and the substrate without any significant degradation to the abrasive compact occurring.

It has been found that the bond strength can be improved if the alloy, prior to being placed between the surfaces, is heat treated at a temperature below its liquidus temperature for a period not exceeding 30 minutes in an atmosphere selected from inert, reducing and non-oxidising atmospheres. Typically the heat treatment of the alloy is carried out at a temperature of 700° to 850° C. The atmosphere is typically argon or hydrogen. Thi improved bond strength is particularly surprising as heat treatment does not appear to have a similar effect on the alloy described in U.S. Pat. No. 4,527,998.

In an example of the invention, a composite diamond abrasive compact consisting of a diamond abrasive compact having a degradation temperature exceeding 915° C. bonded to a cemented tungsten carbide support was bonded to a cemented carbide substrate using a braze alloy which had the following composition, by weight:

| Cu | 53% |
|---|---|
| Mn | 29% |
| Au | 14,5% |
| Ni | 3,5% |

The liquidus temperature of this alloy is 880° C. and its working temperature is 915° C.

The braze alloy was sandwiched between the cemented carbide support of the composite diamond abrasive compact and the cemented carbide substrate and a load applied to urge the two surfaces together. The temperature of the braze alloy was raised over a period of 10 minutes to a temperature of 915° C. and held there for 3-4 seconds. Heating took place in a furnace. After heating, the bonded assembly was removed from the furnace.

It was found that a strong bond having a shear strength of the order of 378 MPa was produced between the composite diamond abrasive compact and the substrate.

A similar tool component was produced except the alloy in this case was heated at 800° C. for 20 minutes in a hydrogen atmosphere prior to being placed between the two carbide surfaces. The shear strength of the bond was found to be 460 MPa. A third tool component was produced in a similar manner and using the same heat treated alloy and the shear strength of the bond was found to be 468 MPa.

A tool component as described above was produced using a braze alloy RI 46 which had a liquidus temperature of 971° C. and the following composition, by weight:

| Au | 34,5%–36,0% |
|---|---|
| Ni | 13,5%–14,5% |
| Pd | 9,5%–10,5% |
| Mn | 9,0%–10,5% |
| Cu | Balance |

The shear strength of the bond was found to be 647 MPa which, as expected, was higher than the shear strengths achieved using the braze alloys of the present invention because it was a higher melting alloy. However, heat treatment of the braze alloy in the manner described above had no effect on the shear strength of the bond obtained.

We claim:

1. A method of bonding a cemented carbide surface to a metal containing surface including the steps of placing a layer of a braze alloy between the surfaces, the alloy consisting of 15–41% Mn, 67–41% Cu, 1–5% Ni and 10–17% Au, all percentages by weight, said alloy having a liquidus below 900° C., urging the surfaces together, and raising the temperature of the alloy to its working temperature thereby creating a bond between the surfaces which has a shear strength exceeding 345 MPa.

2. A method according to claim 1 wherein the temperature of the alloy is raised to its working temperature over a period of 5 to 20 minutes.

3. A method according to claim 1 wherein the alloy is raised to its working temperature over a period which does not exceed 150 seconds.

4. A method according to claim 1 wherein the cemented carbide surface is a surface of a cemented carbide support to which is bonded an abrasive compact, the degradation temperature of which is at or above the working temperature of the alloy.

5. A method according to claim 1 wherein the abrasive compact is a diamond abrasive compact.

6. A method according to claim 1 wherein the metal containing surface is a cemented carbide surface.

7. A method of claim 1 wherein the alloy has the following composition, by weight:

| Cu | 53% |
|---|---|
| Mn | 29% |
| Au | 14,5% |
| Ni | 3,5% |

8. A method according to claim 1 wherein the alloy, prior to being placed between the surfaces, is heat treated at a temperature below its liquidus temperature for a period not exceeding 30 minutes in an atmosphere selected from inert, reducing and non-oxidising atmospheres.

9. A method according to claim 8 wherein the heat treatment of the alloy is carried out at a temperature of 700° C. to 850° C.

10. A tool component consisting of a cemented carbide body bonded to a metal containing body by a braze alloy having a liquidus below 900° C. and having the following composition, by weight:

| Mn | 15–41% |
|---|---|
| Cu | 67–41% |
| Ni | 1–5% |
| Au | 10–17% | the shear strength of the bond between the bodies exceeding 345 MPa.

11. A tool component according to claim 10 wherein the cemented carbide body has an abrasive compact bonded to it.

12. A tool component according to claim 11 wherein the abrasive compact has a degradation temperature at or above the working temperature of the braze alloy.

13. A tool component according to claim 11 wherein the abrasive compact is a diamond abrasive compact.

14. A tool component according to claim 12 wherein the metal containing body is a cemented carbide body.

15. A tool component according to claim 12 wherein the alloy has the following composition, by weight:

| | |
|---|---|
| Cu | 53% |
| Mn | 29% |
| Au | 14,5% |
| Ni | 3,5% |

* * * * *